US006672999B2

(12) United States Patent
Chavez et al.

(10) Patent No.: US 6,672,999 B2
(45) Date of Patent: Jan. 6, 2004

(54) GUDGEON ASSEMBLY

(75) Inventors: Jorge L. Chavez, Rochester, NY (US); Adolf Phillip Greiner, Sinsheim (DE)

(73) Assignee: NexPress Solutions LLC, Rochester, NY (US)

( * ) Notice: Subject to any disclaimer, the term of this patent is extended or adjusted under 35 U.S.C. 154(b) by 0 days.

(21) Appl. No.: 10/097,334

(22) Filed: Mar. 14, 2002

(65) Prior Publication Data

US 2003/0175044 A1 Sep. 18, 2003

(51) Int. Cl.[7] .......... F16C 13/00
(52) U.S. Cl. .......... 492/47; 464/184; 29/895.22
(58) Field of Search .......... 492/47, 45; 29/895.2, 29/895.22; 464/184

(56) References Cited

U.S. PATENT DOCUMENTS

| | | | | |
|---|---|---|---|---|
| 527,708 A | * | 10/1894 | McCorkindale | 464/184 |
| 1,898,115 A | * | 2/1933 | Aldrich | 492/47 |
| 1,898,131 A | * | 2/1933 | Jordan | 492/47 |
| 2,542,287 A | * | 2/1951 | Neubauer | 492/47 |
| 2,543,507 A | * | 2/1951 | Rancourt | 242/609.2 |
| 4,651,643 A | * | 3/1987 | Katz et al. | 101/375 |
| 4,985,959 A | * | 1/1991 | Lieberman et al. | 15/230.11 |
| 6,394,943 B1 | * | 5/2002 | Cormier et al. | 492/47 |

* cited by examiner

*Primary Examiner*—Gregory Vidovich
*Assistant Examiner*—Marc Jimenez
(74) *Attorney, Agent, or Firm*—Lawrence P. Kessler

(57) ABSTRACT

A multi-element gudgeon assembly including (a) a sleeve element having a central bore of substantially uniform diameter, such bore being adapted to receive one end of a rotatable axle; (b) a circular flange element having a central collar portion slidably mounted on the outer surface of the cylindrical sleeve element, and having an outer rim portion adapted to engage, center and support an end of a cylindrical drum for rotation with axle; and (c) a stub axle element mounted on one end of the sleeve element and cooperating with structure on the outer surface of the sleeve element to position the flange element at a fixed desired location on the sleeve element.

3 Claims, 2 Drawing Sheets

GUDGEON ASSEMBLY

FIELD OF THE INVENTION

The present invention relates to improvements in apparatus for supporting drums for rotation. More particularly, it relates to a multi-element gudgeon assembly that, compared to the one-piece gudgeons of the prior art, is substantially less costly to manufacture, generally more accurate in the support it provides and more durable.

BACKGROUND OF THE INVENTION

The commonly assigned U.S. patent application Ser. No. 10/054,453 filed on Jan. 22, 2002 entitled "DRUM-LOADING/UNLOADING APPARATUS FOR ELECTROSTATOGRAPHIC PRINTER/COPIER", discloses an image-recording drum assembly that is adapted for use in an electro-statographic printer/copier to record latent electrostatic images. Referring to the cross-sectional illustration of FIG. 1, such drum assembly includes a hollow cylindrical drum 10 (i.e., a rigid tube or sleeve) supported at opposite ends by front and rear gudgeons 12, 14, respectively. Drum 10 is made of aluminum, and it is provided with an outer layer 11 of photoconductive material on which electro-static images can be formed and developed by the well-known electro statographic imaging process. Each of the drum's supporting gudgeons 12, 14 is basically a unitary (i.e., one piece) structure, preferably being made, for example, of aluminum to facilitate its manufacture. Further, each gudgeon is machined from a metal form so as to define a central collar or sleeve portion (12A, 14A), and an integral, radially-extending circular flange portion (12B, 14B). Each sleeve portion has an axial circular bore with a diameter that is adapted to receive and grasp (via an interference fit) a desired cylindrical portion of a rotatably-driven drive shaft or axle 16. In use, axle 16 serves to rotate the gudgeons, and the drum they support, about the axle's longitudinal axis A.

The rear portion of the drive shaft 16 carries a pair of bearings B1, B2 by which the rear portion of the drum assembly can be supported for rotation. Each of the gudgeon's radially-extending circular flange portions (12B, 14B) terminates to define a tapered circular rim R that is shaped to engage, center and support the respective tapered ends of drum 10 as the gudgeons are caused to move axially towards each other, as explained below.

In contrast with the rear gudgeon 14 of the above-described drum assembly, the front gudgeon 12 further defines a stub-axle portion 12C that carries a bearing B3 by which the front of the drum assembly is also supported for rotation. Further, to enable removal of the drum portion of the drum assembly, e.g., for servicing or replacement, the front gudgeon 12 is provided with a releasable, radially-expandable coupling 20 by which the gudgeon can be readily disconnected and removed from the axle 16. Upon disconnecting the front gudgeon from the axle, drum 10 can slide axially, away from the rear gudgeon 14 and off the forward end of the axle. Coupling 20 is housed within the sleeve portion 12A of gudgeon 12, forward of that portion of the axle engaged by the sleeve. Activation of the coupling 20 is effected by a threaded rod 18 that passes axially through a bore hole formed in the stub axle portion 12C of the gudgeon. Rod 18 has an integral platform 18A of enlarged diameter and a threaded end 18B that is adapted to be received by a threaded bore hole 16A formed in the forward end of axle 16. As rod 18 rotates in a direction to engage the threaded end of rod 18 with the borehole 16A, the front gudgeon is drawn towards the rear gudgeon, and the drum 10 becomes seated on the respective gudgeon rims R. Continued rotation of rod 18 causes the radially expandable coupling 20 to be compressed against a stiff coil spring 22. Axial movement of the coil spring is limited by a retainer ring 23 projecting from a circular groove 12D formed in the inner wall of sleeve portion 12A. As the coupling 20 compresses axially, it expands radially, thereby engaging the inner wall of the gudgeon's sleeve portion 12A tightly securing the gudgeon 12 to the axle 16. The unitary front gudgeon of the prior art is better shown in the cross-sectional illustration of FIG. 2.

From the foregoing description and illustration in FIG. 2, it will be appreciated that the unitary front gudgeon 12 is a relatively complex structure that requires precision machining to achieve a desired minimal runout of the overall drum assembly. In machining the front gudgeon from a single block of aluminum, it may be appreciated that it is difficult to cut the inside bore of the sleeve portion 12A to the depth required to house the axle and coupling assembly while maintaining a close tolerance on this central bore hole. It will be appreciated that, owing to the shape of the stub axle 12C, the central bore of sleeve portion 12A can be accessed from only one end. Thus, the deeper the bore in the sleeve portion, the more difficult it is to maintain the requisite control of the cutting tool, and variations from a nominal circular cross-section begin to occur. Further, the use of aluminum for the entire gudgeon represents a compromise between materials that are relatively easy to machine, and those that provide an extended wear capability. Ideally, at least the sleeve portion 12A that houses the movable components of the coupling 20 should be made of a harder and more durable metal than aluminum. But to manufacture the gudgeon entirely from steel, or the like, would add significantly to manufacturing costs.

SUMMARY OF THE INVENTION

In view of the foregoing, an object of this invention is to provide a gudgeon assembly which overcomes the above-noted manufacturing, accuracy and durability problems associated with the one-piece gudgeon structures of the prior art.

In accordance with the invention, an improved gudgeon of the type described above with reference to the "front" drum-supporting gudgeon is provided. According to a preferred embodiment of the invention, such gudgeon takes the form of a multi-element assembly including a cylindrical sleeve element, a flange element, and a stub axle element. The cylindrical sleeve element defines a cylindrical central bore of substantially uniform diameter, such bore being adapted to receive one end of an axle. The flange element includes an inner collar portion slidably mounted on the outer surface of the cylindrical sleeve element, and has an outer rim portion adapted to engage, center and support the end of a cylindrical drum. The stub axle element is mounted on one end of the cylindrical sleeve element and cooperates with structure on the sleeve element to position the flange element at a fixed desired location on the sleeve element. Preferably, the stub axle element is provided with a central bore adapted to receive a threaded rod which, in turn, is adapted to engage a threaded opening in the free end of an axle positioned within the sleeve's central bore in order to adjust the axial position of the gudgeon assembly relative to the axle. Preferably, the sleeve and stub axle elements are made of hardened steel, whereas the flange element is made of aluminum with a hard coat to prevent wear.

By fabricating the gudgeon of the invention from three independent elements, each being readily manufactured to precise standards, the overall precision and reproducibility of the gudgeon assembly are enhanced. Further, being able to select different materials for each component has the effect of improving the reliability and durability of the assembly.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DETAILED DESCRIPTION OF THE INVENTION

Figure 1:
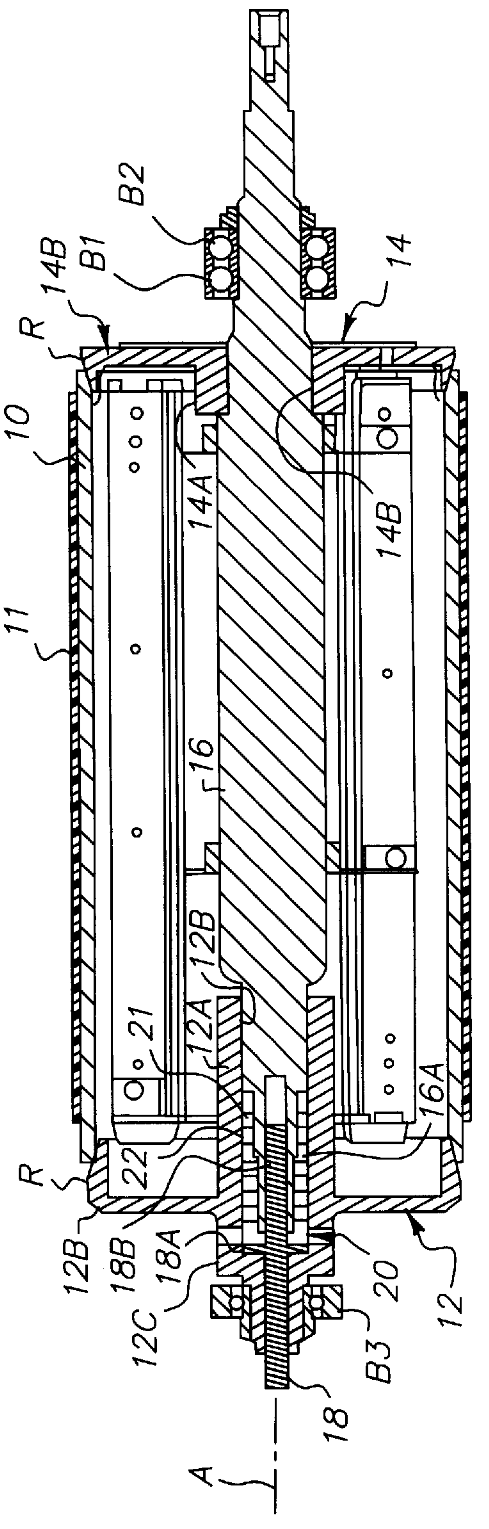
FIG. 1 (PRIOR ART)
FIG. 1 is a cross-sectional illustration of an image-recording drum assembly having a gudgeon structured in accordance with the prior art.
Figure 2:
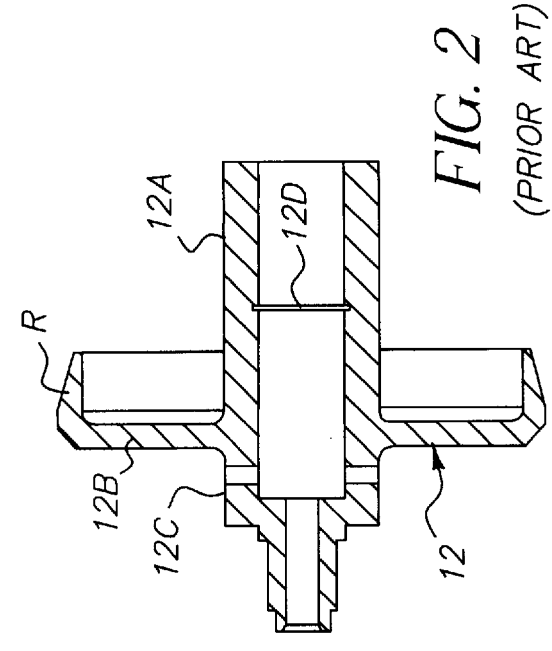
FIG. 2 (PRIOR ART)
FIG. 2 is a cross-sectional illustration of the gudgeon shown in FIG. 1.
Figure 3:
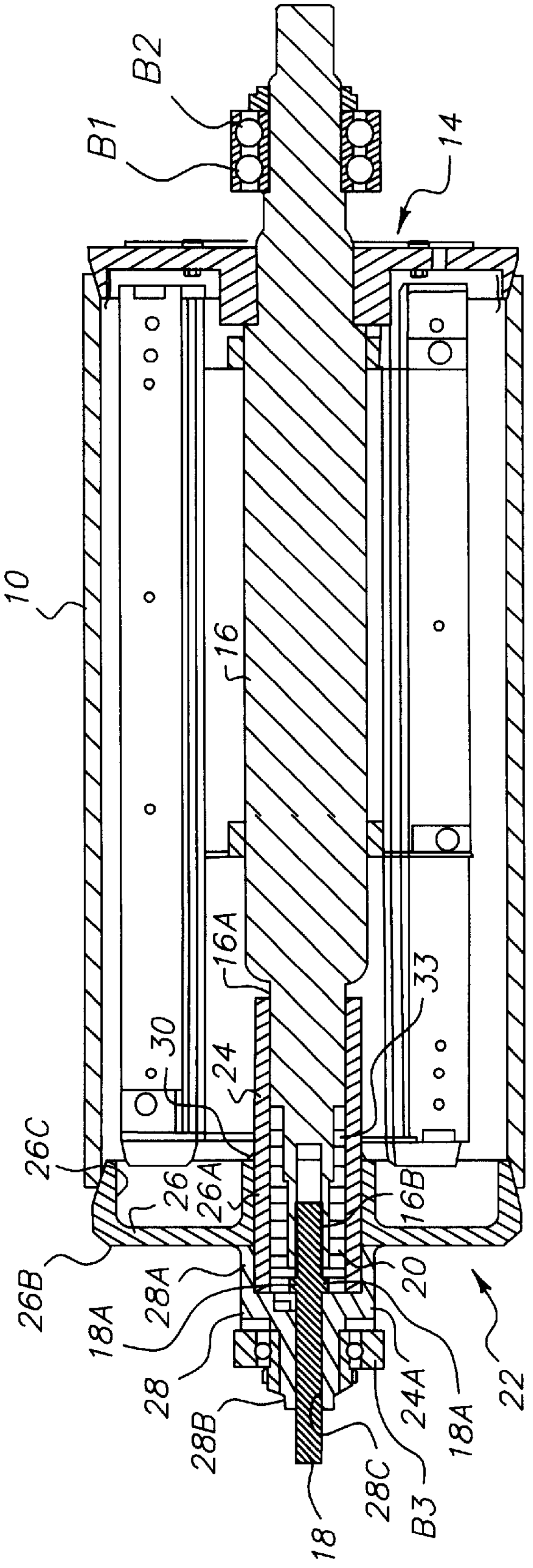
FIG. 3 is a cross-sectional illustration of a drum assembly embodying a preferred multi-element gudgeon assembly of the present invention.
Figure 4:
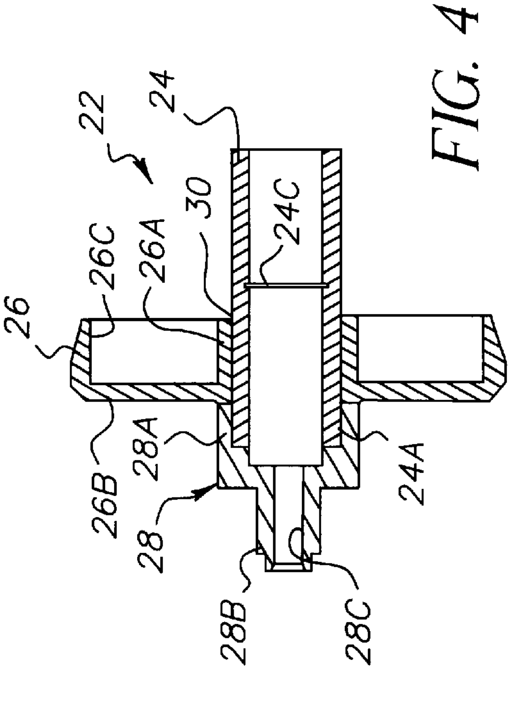
FIG. 4 is a cross-sectional illustration of the multi-element gudgeon assembly of FIG. 3.

Referring now to FIG. 3, a drum assembly of the type discussed above is shown including a new and improved multi-element front gudgeon assembly 22. In contrast with the unitary front gudgeon of the prior art, gudgeon assembly 22 includes three primary elements: a sleeve element 24, a flange element 26, and a stub axle element 28. The sleeve element 24 is a cylindrical tube of constant interior diameter that can be milled with high precision using a cutting tool that can readily operate from opposite ends of the tube. Preferably, the sleeve element is made of stainless steel, and its inner diameter is adapted to receive, with minimal clearance, the cylindrical portion 16A of one end of the axle 16. A small circular groove is cut in the central region of the outer surface of the sleeve element 24 to receive a small retainer ring 30. The latter projects radially outward from the outer surface of the sleeve element and serves, as explained below, to limit the extent of sliding movement of the flange element 26 over the outer surface of the sleeve. The outer surface 24A of one end of the sleeve element is threaded to receive the threaded collar portion 28A of the stub axle element 28, as also explained below. Further, a narrow circular groove 24C is cut in the inner wall of the sleeve element. As in the case of the unitary gudgeon shown in FIG. 1, groove 24 contains a retainer ring 33 that limits axial movement of coupling 20 as the coupling-activating rod 18 is rotated.

Flange element 26 includes a central collar portion 26A that is integral with a flange portion 26B and a rim portion 26C. The flange element is preferably made of aluminum which is provided with a hard coat to prevent wear. Collar portion 26A has an inside diameter slightly larger than the outside diameter of sleeve element 24, whereby this collar portion can slide axially over the outer surface of the sleeve element between the threaded portion 24A and the retainer ring 30. The flange portion 26B extends substantially radially from the collar portion 26A. The flange portion terminates in the rim portion 26C, which has a taper adapted to engage, center and support the drum 10 upon assembly.

The stub axle element 28 includes a threaded collar portion 28A having internal threads that are adapted to engage the threaded portion 24A of the sleeve element 24. Preferably, the stub axle element 28 is made of hardened steel. As the stub axle collar 28A is threaded onto the sleeve threaded portion 24A, the leading edge of the collar cooperates with the retainer ring 30 to accurately position the flange element 26 on the sleeve element 24 and to lock it in place in a desired position thereon. The stub axle element 28 further includes an axle portion 28B having an outer surface that supports bearing B3, and an inner surface that defines a central bore 28C. The releasable coupling-activating rod 18 passes through the central bore 28C of the stub axle element to engage a threaded bore 16B in the end of the axle 16. As indicated earlier, the end of rod 18 is threaded to engage the axle. As rod 18 rotates in a direction to engage the threaded drive shaft bore 16B, an integral disk-shaped platform 18A on the rod operates to compress the coupling 20 in the axial direction. As described above, the nature of the coupling 20 is such that the compression of the coupling in the axial direction results in expansion in the radial direction. This causes an increase in the grip on the axle 16 and in the flange element 26 by that portion of the sleeve element 24 that contains the coupling.

From the foregoing, it may be appreciated that the multi-element gudgeon assembly 22 of the invention affords certain technical advantages when compared to the one-piece structure (element 12) of the prior art. For example, the individual elements of the multi-element gudgeon assembly may be more easily made of diverse, particularly selected materials which enable respective selective finishing to provide the tight tolerance requirements for minimum slip fit and runout with maximum reliability. Also, being made of discrete elements that are relatively simple in geometric shape and size, the elements can be readily fabricated to very close tolerances without undue effort. This has the effect of minimizing the run-out characteristics of the drum assembly. Further, by making the sleeve portion from hardened steel, any tendency for the coupling 20 to gouge the inner wall of the sleeve as the coupling rod is rotated (as is the case when the sleeve is made of a softer metal like aluminum) is eliminated. By making the flange portion from aluminum or the like, the cost of milling such part is low compared to milling the part from steel. Overall, since the individual elements need only be finished to utilizing normal machine tolerances to obtain the desired fit, runout reproducibility, etc; and, as such, the costs and reproducibility are minimized.

While the invention has been described with reference to a particularly preferred embodiment, it will be apparent that certain modifications can be made without departing from the spirit of the invention; such modifications are intended to be protected by the following claims.

PARTS LIST

10—drum
11—outer layer of drum
12—front gudgeon
12A—sleeve portion
12B—flange portion
12C—stub axle portion
R—rim
14—rear gudgeon
14A—sleeve portion
14B—flange portion
14C—stub axle portion
16—drive shaft/axle
16A—threaded bore hole in axle end
18—coupling rod

18A—platform
18B—threaded end
B1–B3—bearings
A—axis of rotation
20—releasable coupling
21—retainer ring
22—coupling spring
23—multi-element gudgeon assembly
24—sleeve element
24A—threaded portion of the sleeve element
26—flange element
26A—collar portion of flange element
26B—flange portion
26C—rim portion
28—stub axle element
28A—collar portion of stub axle element
28B—axle portion
30—outer retainer ring
33—inner retainer ring

What is claimed is:

1. A gudgeon assembly adapted for use with an axle for supporting a rigid tube or hollow cylindrical drum for rotation, said gudgeon assembly comprising:

(a) a sleeve element having a cylindrical central bore of substantially uniform diameter, such bore being adapted to receive one end of said axle;

(b) a flange element including a central collar portion slidably mounted externally on said sleeve element, said flange element having a flange portion radially-extending from said collar portion and terminating in a rim portion that is adapted to engage, center, and support an end of a tube or drum; and (c) a stub axle element mounted externally on one end of said sleeve element, said stub axle element defining a central bore; and (d) a threaded rod which is received in said central bore of said sleeve element, said threaded rod engaging a threaded opening in one end of an axle positioned within said central bore of said sleeve element in order to adiustably position said sleeve element relative to said axle within said central bore, wherein said stub shaft element cooperates with said sleeve element to adjustably position said flange element at a fixed desired location on said sleeve element.

2. The gudgeon assembly as defined by claim 1 wherein said sleeve element supports a retainer ring that cooperates with said stub axle element to position said central collar of said flange element therebetween, on said sleeve element.

3. The gudgeon assembly as defined by claim 1 wherein said sleeve element and stub axle elements are made of hardened steel, and said flange element is made of aluminum with a hard coat to prevent wear.

* * * * *